(12) United States Patent
Tanaka et al.

(10) Patent No.: US 9,552,785 B2
(45) Date of Patent: Jan. 24, 2017

(54) LIQUID CRYSTAL DISPLAY DEVICE (71) Applicant: Sharp Kabushiki Kaisha, Osaka (JP)

(72) Inventors: Kohhei Tanaka, Osaka (JP); Mitsuhiro Murata, Osaka (JP); Akihito Jinda, Osaka (JP); Yosuke Iwata, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 88 days.

(21) Appl. No.: 14/652,344

(22) PCT Filed: Dec. 13, 2013

(86) PCT No.: PCT/JP2013/083521
§ 371 (c)(1),
(2) Date: Jun. 15, 2015

(87) PCT Pub. No.: WO2014/097998
PCT Pub. Date: Jun. 26, 2014

(65) Prior Publication Data
US 2015/0325187 A1    Nov. 12, 2015

(30) Foreign Application Priority Data
Dec. 19, 2012   (JP) ................. 2012-277284

(51) Int. Cl.
*G09G 3/36* (2006.01)
*G02F 1/1345* (2006.01)
*G02F 1/1343* (2006.01)

(52) U.S. Cl.
CPC ......... *G09G 3/3614* (2013.01); *G02F 1/13454* (2013.01); *G02F 1/134363* (2013.01);
(Continued)

(58) Field of Classification Search
CPC ............... G09G 3/3614; G09G 2300/0495; G02F 1/13454; G02F 1/134363; G02F 2001/134381
See application file for complete search history.

(56) References Cited

U.S. PATENT DOCUMENTS 6,469,765 B1 * 10/2002 Matsuyama ...... G02F 1/134363
349/141
6,525,798 B1 * 2/2003 Yamakita .......... G02F 1/134363
349/106
(Continued)

FOREIGN PATENT DOCUMENTS

JP        2004-354407 A    12/2004

*Primary Examiner* — Christopher E Leiby
(74) *Attorney, Agent, or Firm* — Chen Yoshimura LLP (57) ABSTRACT

Provided is a liquid crystal display device in which both a vertical electric field and a horizontal electric field are used and flickering is hardly recognized. The liquid crystal display device includes a liquid crystal panel and a control unit. The control unit includes a horizontal electric field control unit and a vertical electric field control unit. The horizontal electric field control unit controls the potentials of pairs of drive electrodes included in the liquid crystal panel, and thereby controls a horizontal electric field that is generated between each pair of drive electrodes. The vertical electric field control unit controls the potentials of a common electrode and an opposite electrode included in the liquid crystal panel, and thereby controls a vertical electric field that is generated between the common electrode and the opposite electrode. The horizontal electric field control unit controls the intensity and the polarity of the horizontal electric field when the vertical electric field control unit is causing the vertical electric field to be generated. The vertical electric field control unit inverts the polarity of the vertical electric field when the horizontal electric field control unit is maintaining the polarity of the horizontal electric field.

10 Claims, 9 Drawing Sheets (52) U.S. Cl.
CPC ............ *G02F 2001/134381* (2013.01); *G09G 2300/0495* (2013.01)

(56) References Cited

U.S. PATENT DOCUMENTS

| | | | | |
|---|---|---|---|---|
| 2002/0089632 A1* | 7/2002 | Wong | ................ | G02F 1/133707 349/143 |
| 2003/0128305 A1* | 7/2003 | Izumi | ................ | G02F 1/134363 349/37 |
| 2003/0218664 A1* | 11/2003 | Sakamoto | ......... | G02F 1/133555 347/114 |
| 2005/0024548 A1* | 2/2005 | Choi | ................ | G02F 1/134363 349/43 |
| 2005/0253797 A1* | 11/2005 | Kamada | ............ | G02F 1/133753 345/89 |
| 2007/0080370 A1* | 4/2007 | Miyachi | .............. | G02F 1/13624 257/107 |
| 2007/0126969 A1* | 6/2007 | Kimura | ............ | G02F 1/134363 349/141 |
| 2009/0091587 A1* | 4/2009 | Kim | ................ | G02F 1/134363 345/690 |
| 2010/0110358 A1* | 5/2010 | Um | ................... | G02F 1/134363 349/141 |
| 2011/0122114 A1* | 5/2011 | Tanaka | ................ | G09G 3/3648 345/211 |
| 2011/0273638 A1* | 11/2011 | Tsai | ........................ | G02F 1/137 349/33 |
| 2013/0148047 A1* | 6/2013 | Lu | ........................... | G09G 3/36 349/33 |
| 2014/0002762 A1* | 1/2014 | Iwata | ................... | G09G 3/3648 349/42 |
| 2014/0016075 A1* | 1/2014 | Iwata | ................ | G02F 1/134363 349/141 |
| 2014/0111561 A1* | 4/2014 | Iyama | .................. | G09G 3/3648 345/690 |
| 2014/0132906 A1* | 5/2014 | Yoshioka | .......... | G02F 1/134309 349/141 |
| 2014/0188671 A1* | 7/2014 | Mountz | ................ | G06Q 10/087 705/28 |
| 2014/0240651 A1* | 8/2014 | Yoshioka | .......... | G02F 1/133707 349/141 |
| 2014/0264330 A1* | 9/2014 | Iyama | .................. | G02F 1/134309 257/43 |
| 2014/0267964 A1* | 9/2014 | Iyama | .................. | G09G 3/3648 349/33 |
| 2015/0098033 A1* | 4/2015 | Murata | ................ | G09G 3/3648 349/33 |
| 2015/0109274 A1* | 4/2015 | Yoshioka | ............. | G09G 3/3648 345/209 |
| 2015/0131019 A1* | 5/2015 | Kita | ..................... | G09G 3/3648 349/42 |
| 2015/0170600 A1* | 6/2015 | Jinda | ............ | G02F 1/134363 345/206 |
| 2015/0177571 A1* | 6/2015 | Yoshida | ............ | G02F 1/134363 349/33 |

* cited by examiner

FIG. 11 ent of the present invention includes: a liquid crystal panel
LIQUID CRYSTAL DISPLAY DEVICE

TECHNICAL FIELD

The present invention relates to a liquid crystal display device, and more particularly, relates to a liquid crystal display device that uses both a vertical electric field and a horizontal electric field to control the orientation of liquid crystal molecules.

BACKGROUND ART

Operation modes for liquid crystal in a liquid crystal display device include modes in which a vertical electric field is used and in which a horizontal electric field is used. A vertical electric field is generated between a pair of substrates arranged on either side of a liquid crystal layer. A horizontal electric field is generated between electrodes on one substrate from among a pair of substrates arranged on either side of a liquid crystal layer. Examples of operation modes in which a vertical electric field is used are a twisted nematic (TN) mode and a vertical alignment (VA) mode. An example of an operation mode in which a horizontal electric field is used is an in-plane switching (IPS) mode.

Furthermore, liquid crystal display devices that use both a vertical electric field and a horizontal electric field to control the orientation of liquid crystal molecules have been proposed in recent years (for example, see Japanese Patent Application Laid-Open Publication No. 2004-354407).

SUMMARY OF THE INVENTION

A vertical electric field and a horizontal electric field both have a positive polarity and a negative polarity. Therefore, when both a vertical electric field and a horizontal electric field are to be used, four combinations are required as combinations of the polarities of the vertical electric field and the horizontal electric field. Put simply, four frames are required when these combinations are to be realized. For example, in the case where a frame frequency is 60 Hz, a polarity inversion frequency becomes 30 Hz when either a vertical electric field or a horizontal electric field is to be used. In contrast to this, the polarity inversion frequency becomes 15 Hz when both a vertical electric field and a horizontal electric field are used. Consequently, flickering is easily recognized.

An objective of the present invention is to provide a liquid crystal display device in which both a vertical electric field and a horizontal electric field are used and flickering is hardly recognized.

A liquid crystal display device according to one embodiment of the present invention includes: a liquid crystal panel that has a display region in which a plurality of pixels are arranged; and a control unit that causes an image to be displayed in the display region, wherein the liquid crystal panel includes: an active matrix substrate; an opposite substrate facing the active matrix substrate; and a liquid crystal layer sealed between the active matrix substrate and the opposite substrate, wherein the active matrix substrate includes: a pair of drive electrodes in each pixel; and a common electrode arranged further away from the liquid crystal layer than the pair of drive electrodes in each pixel, wherein the opposite substrate includes an opposite electrode facing the common electrode and the pair of drive electrodes in each pixel, wherein the control unit includes: a horizontal electric field control unit that controls potentials of the pair of drive electrodes in each pixel to control a horizontal electric field that is generated between each of the pair of drive electrodes in each pixel, and a vertical electric field control unit that controls potentials of the common electrode and the opposite electrode to control a vertical electric field that is generated between the common electrode and the opposite electrode, wherein, when the vertical electric field control unit is causing the vertical electric field to be generated, the horizontal electric field control unit controls an intensity and a polarity of the horizontal electric field, and wherein, when the horizontal electric field control unit is maintaining the polarity of the horizontal electric field, the vertical electric field control unit inverts a polarity of the vertical electric field.

Flickering is hardly recognized in a liquid crystal display device according to an embodiment of the present invention.

DETAILED DESCRIPTION OF EMBODIMENTS

A liquid crystal display device according to one embodiment of the present invention includes: a liquid crystal panel that has a display region in which a plurality of pixels are arranged; and a control unit that causes an image to be displayed in the display region, wherein the liquid crystal panel includes: an active matrix substrate; an opposite substrate facing the active matrix substrate; and a liquid crystal layer sealed between the active matrix substrate and the opposite substrate, wherein the active matrix substrate includes: a pair of drive electrodes in each pixel; and a common electrode arranged further away from the liquid crystal layer than the pair of drive electrodes in each pixel, wherein the opposite substrate includes an opposite electrode facing the common electrode and the pair of drive electrodes in each pixel, wherein the control unit includes: a horizontal electric field control unit that controls potentials of the pair of drive electrodes in each pixel to control a horizontal electric field that is generated between each of the pair of drive electrodes in each pixel, and a vertical electric field control unit that controls potentials of the common electrode and the opposite electrode to control a vertical electric field that is generated between the common electrode and the opposite electrode, wherein, when the vertical electric field control unit is causing the vertical electric field to be generated, the horizontal electric field control unit controls an intensity and a polarity of the horizontal electric field, and wherein, when the horizontal electric field control unit is maintaining the polarity of the horizontal electric field, the vertical electric field control unit inverts a polarity of the vertical electric field.

In the aforementioned configuration (Configuration 1), the polarity of the vertical electric field is inverted when the polarity of the horizontal electric field is being maintained. Therefore, the combinations (four combinations) of polarities required when both the vertical electric field and the horizontal electric field are to be used can be realized with two frames. As a result, the polarity inversion frequency becomes 30 Hz when the frame frequency is 60 Hz, for example. In other words, the polarity inversion frequency is the same as when either the vertical electric field or the horizontal electric field is used. Consequently, flickering is hardly recognized.

Configuration 2 is Configuration 1, wherein, when the polarity of the horizontal electric field is being maintained, the vertical electric field control unit causes a length of a period in which the polarity of the vertical electric field is positive to be the same as a length of a period in which the polarity of the vertical electric field is negative.

Since the polarity of the vertical electric field is not biased toward either polarity, in other words, since a direct-current component is not included in a drive voltage for liquid crystal, the lifespan of the liquid crystal panel is increased. As a result, the reliability of the liquid crystal panel is improved.

Configuration 3 is Configuration 1 or 2, wherein the vertical electric field control unit causes a potential of the opposite electrode to change to invert the polarity of the vertical electric field.

The opposite electrode is arranged on the opposite substrate. Therefore, the opposite electrode is further away from the pairs of drive electrodes than the common electrode. As a result, it is possible to reduce the range of a fluctuation in potential that is generated in each drive electrode due to the polarity of the vertical electric field being inverted.

Configuration 4 is Configuration 3, wherein the opposite electrode includes a plurality of segmented electrodes, and wherein the vertical electric field control unit causes a potential of each of the segmented electrodes to change sequentially.

The way in which the polarity of the vertical electric field is changed when the polarity of the horizontal electric field is being maintained becomes the same in all of the pixels. It is therefore possible to reduce a luminance gradient in the display region.

Furthermore, the load incurred when a potential is changed decreases compared with when the opposite electrode is not divided into a plurality of electrodes.

Configuration 5 is Configuration 1, wherein the vertical electric field control unit causes the potential of the common electrode to change to invert the polarity of the vertical electric field.

The common electrode is arranged on the active matrix substrate. Wiring composed of a metal film is arranged on the active matrix substrate to constitute gate wires and source wires, for example. Therefore, wiring that is connected to the common electrode can be formed of the same material as the gate wires and the source wires. In this case, the resistance of the wiring connected to the common electrode can be reduced. As a result, the load incurred when the potential of the vertical electric field is inverted becomes less than when the potential of the opposite electrode is changed.

Configuration 6 is Configuration 5, wherein the common electrode includes a plurality of segmented electrodes, and wherein the vertical electric field control unit causes a potential of each of the segmented electrodes to change sequentially.

The way in which the polarity of the vertical electric field is changed when the polarity of the horizontal electric field is being maintained becomes the same in all of the pixels. It is therefore possible to reduce a luminance gradient in the display region.

Configuration 7 is any one of Configurations 1 to 6, wherein a direction in which the polarity of the vertical electric field is inverted when the horizontal electric field is maintained with a positive polarity is the same as a direction in which the polarity of the vertical electric field is inverted when the horizontal electric field is maintained with a negative polarity.

The direction of the fluctuation in potential that is generated in each drive electrode due to the polarity of the vertical electric field being inverted becomes the same in all of the pixels. Therefore, in the case where switching elements that are connected to each drive electrode are thin film transistors, for example, the thin film transistors are prevented from operating erroneously even when there is a fluctuation in potential due to an inversion of the polarity of the vertical electric field. As a result, the reliability of the operation of the thin film transistors is improved.

Configuration 8 is any one of Configurations 1 to 7, wherein the opposite substrate further includes a dielectric layer arranged closer to the liquid crystal layer than the opposite electrode.

In this case, it becomes easier for the liquid crystal molecules near the opposite electrode to become horizontal when the horizontal electric field is being generated. As a result, transmittance is improved.

Configuration 9 is any one of Configurations 1 to 8, wherein the horizontal electric field control unit controls the potentials of the pair of drive electrodes in each pixel with respect to all of the pixels in a period that is shorter than one frame.

Since a data writing period is shorter than one frame, it is possible to suppress the amount of power consumed as long as nothing is carried out in the remaining period.

Hereafter, more detailed embodiments of the present invention will be described with reference to the drawings. The same or corresponding portions in the drawings are denoted by the same reference characters and descriptions thereof will not be repeated. It should be noted that, in order to aid understanding of the description, configurations are shown in a simplified or schematic manner and some components have been omitted in the drawings referred to hereinafter. Furthermore, the dimension ratios between the components shown in each drawing do not necessarily indicate actual dimensional ratios.

Embodiment 1

Figure 1:
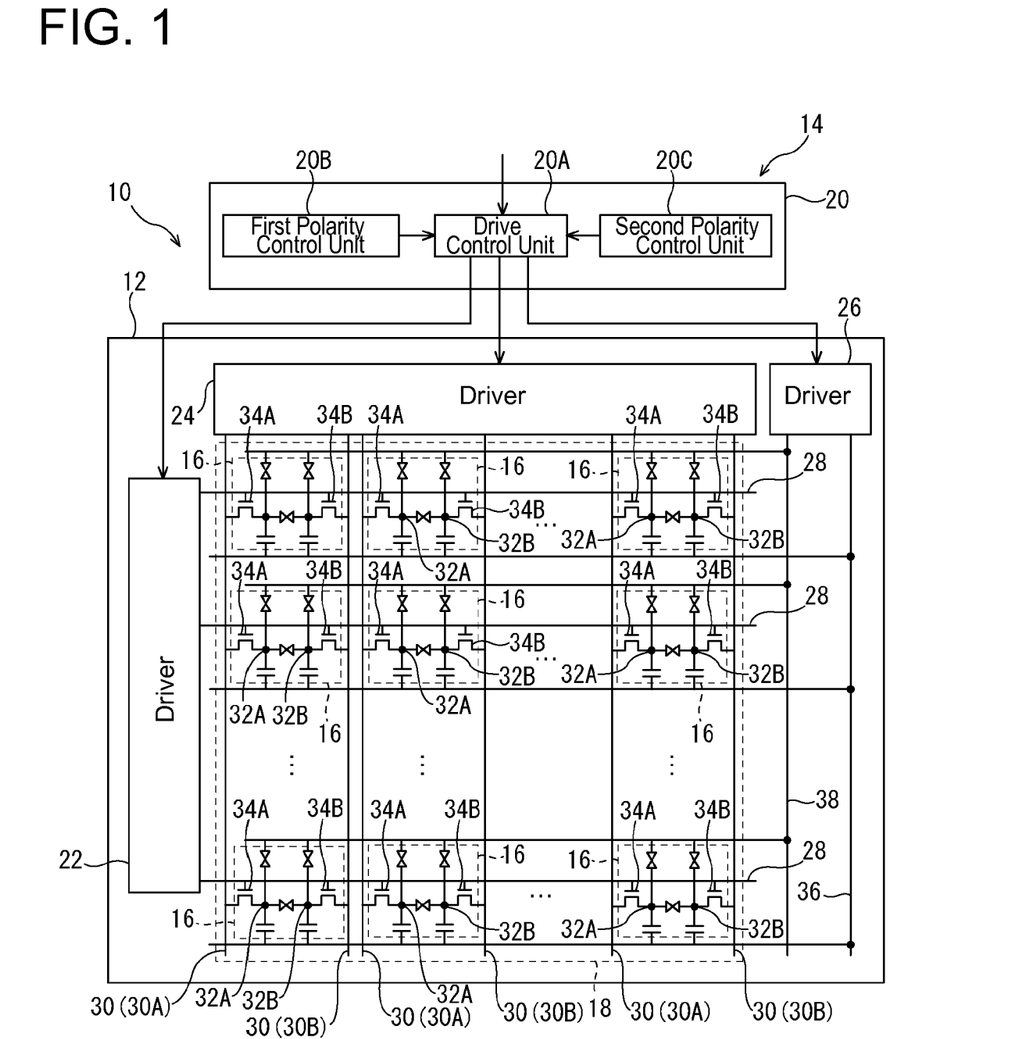
FIG. 1 is a schematic drawing showing an example of a schematic configuration of a liquid display device according to Embodiment 1 of the present invention.

FIG. 1 shows a liquid crystal display device 10 according to Embodiment 1 of the present invention. The liquid crystal display device 10 includes a liquid crystal panel 12 and a control unit 14. The control unit 14 includes a control circuit 20 and drivers 22, 24, and 26. The control circuit 20 includes a drive control unit 20A, a first polarity control unit 20B, and a second polarity control unit 20C.

The liquid crystal panel 12 has a display region 18 in which a plurality of pixels 16 are arranged. In the example shown in FIG. 1, the plurality of pixels 16 are arranged in a matrix.

The liquid crystal panel 12 includes a plurality of gate wires 28 and a plurality of source wires 30. The plurality of gate wires 28 and the plurality of source wires 30 are arranged in a grid pattern.

The plurality of gate wires 28 are connected to the driver 22. The driver 22 is what is referred to as a gate driver.

The plurality of source wires 30 are connected to the driver 24. The driver 24 is what is referred to as a source driver.

In the example shown in FIG. 1, the plurality of source wires 30 are constituted of first source wires 30A and second source wires 30B arranged in an alternating manner. In other words, the plurality of source wires 30 include a plurality of sets of source wires 30A and 30B, a set being constituted of a first source wire 30A and a second source wire 30B arranged adjacent to each other.

The liquid crystal panel 12 includes a pair of drive electrodes 32A and 32B in each pixel 16. The drive electrode 32A is connected to a first source wire 30A by way of a thin film transistor 34A. The drive electrode 32B is connected to a second source wire 30B by way of a thin film transistor 34B.

In the thin film transistor 34A, a gate is connected to a gate wire 28, a source is connected to the first source wire 30A, and a drain is connected to the drive electrode 32A. In the thin film transistor 34B, a gate is connected to the gate wire 28, a source is connected to the second source wire 30B, and a drain is connected to the drive electrode 32B.

The liquid crystal panel 12 includes a common electrode 36 and an opposite electrode 38. The common electrode 36 and the opposite electrode 38 are connected to the driver 26.

The drive control unit 20A outputs gate signals to the driver 22. The driver 22 sequentially outputs the gate signals to the plurality of gate wires 28. The gate signals are the potentials of the thin film transistors 34A and 34B. The thin film transistors 34A and 34B are driven by the driver 22 outputting the gate signals.

The drive control unit 20A outputs image signals (gradation signals) to the driver 24. The gradation signals are the potentials of each drive electrode 32A and 32B. The driver 24 sequentially outputs the gradation signals, which correspond to gate wires 28 selected by the driver 22, to the plurality of sets of source wires 30A and 30B. The potential of each drive electrode 32A and 32B is set by the driver 24 outputting the gradation signals. As a result, a horizontal electric field is generated between each pair of drive electrodes 32A and 32B.

The drive control unit 20A outputs drive signals to the driver 26. The driver 26 outputs the drive signals to the common electrode 36 and the opposite electrode 38. The drive signals are the potentials of the common electrode 36 and the opposite electrode 38. The potentials of the common electrode 36 and the opposite electrode 38 are set by the driver 26 outputting the drive signals. As a result, a vertical electric field is generated between the common electrode 36 and the opposite electrode 38.

The first polarity control unit 20B outputs first polarity signals to the drive control unit 20A. The drive control unit 20A generates gradation signals having a positive polarity and gradation signals having a negative polarity on the basis of the first polarity signals. The drive control unit 20A outputs the gradation signals having a positive polarity and the gradation signals having a negative polarity to the driver 24 in an alternating manner. The driver 24 outputs the gradation signals having a positive polarity and the gradation signals having a negative polarity to each set of the source wires 30A and 30B in an alternating manner. The polarity of the horizontal electric field is thereby inverted.

The second polarity control unit 20C outputs second polarity signals to the drive control unit 20A. The drive control unit 20A generates drive signals having a positive polarity and drive signals having a negative polarity on the basis of the second polarity signals. The drive control unit 20A outputs the drive signals having a positive polarity and the drive signals having a negative polarity to the driver 26 in an alternating manner. The driver 26 outputs the drive signals having a positive polarity and the drive signals having a negative polarity to the common electrode 36 and the opposite electrode 38 in an alternating manner. The polarity of the vertical electric field is thereby inverted.

Figure 2:
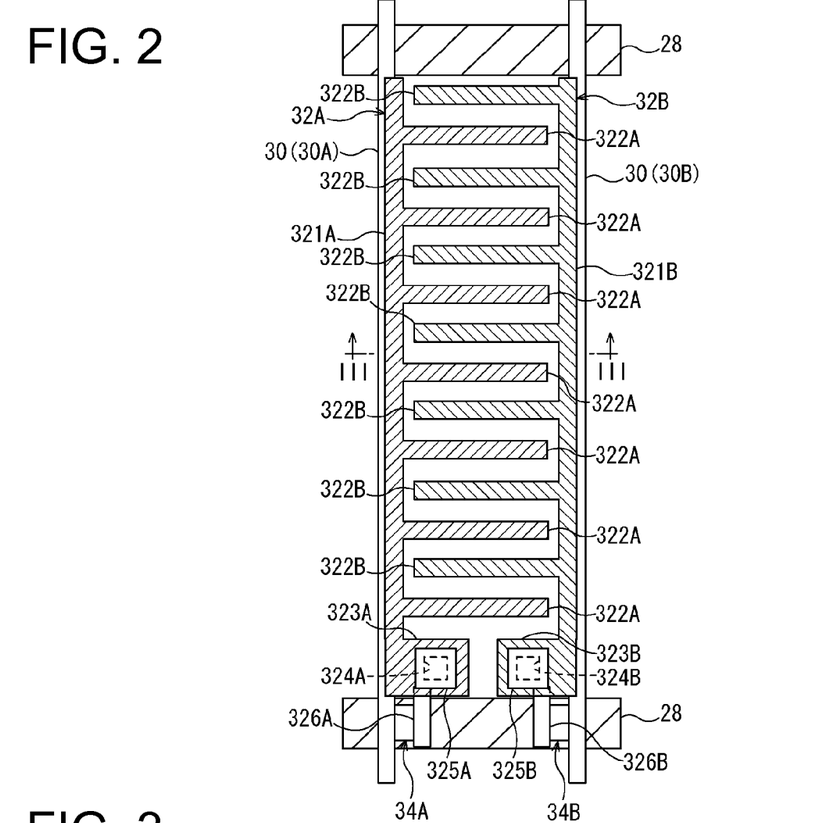
FIG. 2 is a plan view showing a schematic configuration of a pixel of a liquid crystal panel.
Figure 3:
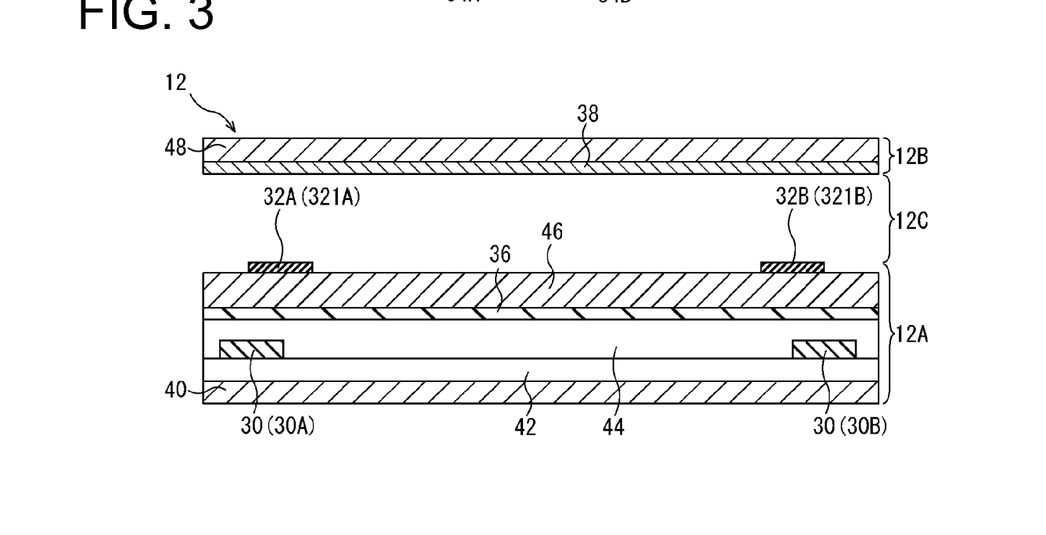
FIG. 3 is a cross-sectional view taken along the line III-III in FIG. 2.

The details of the liquid crystal panel 12 will be described with reference to FIGS. 2 and 3. As shown in FIG. 3, the liquid crystal panel 12 includes an active matrix substrate 12A, an opposite substrate 12B, and a liquid crystal layer 12C.

The active matrix substrate 12A includes a base substrate 40, the plurality of gate wires 28 (see FIG. 2), an insulating layer 42, the plurality of source wires 30 (the plurality of sets of source wires 30A and 30B), an insulating layer 44, the pairs of drive electrodes 32A and 32B, the thin film transistors 34A and 34B (see FIG. 2), the common electrode 36, and an insulating layer 46. The plurality of gate wires 28 are formed on a main surface of the base substrate 40, for example. The insulating layer 42 covers the plurality of gate wires 28. The plurality of source wires 30 are formed in contact with the insulating layer 42. The insulating layer 44 covers the plurality of source wires 30. The common electrode 36 is formed in contact with the insulating layer 44. The common electrode 36 is arranged across the entirety of the display region 18. The insulating layer 46 covers the common electrode 36. The pairs of drive electrodes 32A and 32B are formed in contact with the insulating layer 46. The thin film transistors 34A and 34B are arranged in positions that superimpose the gate wires 28.

The drive electrode 32A includes a first electrode portion 321A and a plurality of second electrode portions 322A.

The first electrode portion 321A extends parallel with the first source wires 30A and overlaps a first source wire 30A in plan view. The plurality of second electrode portions 322A are each connected to the first electrode portion 321A. The plurality of second electrode portions 322A are arranged side-by-side with a prescribed space therebetween in the direction in which the first electrode portion 321A extends. Each of the plurality of second electrode portions 322A extends parallel with the gate wires 28.

A connection electrode portion 323A is formed at the other end of the first electrode portion 321A. The connection electrode portion 323A has a contact hole 324A. The connection electrode portion 323A is connected to a drain electrode portion 326A by way of a contact electrode portion 325A. The contact electrode portion 325A is formed at a position that superimposes the contact hole 324A. The drain electrode portion 326A is connected to the drain of the thin film transistor 34A.

The drive electrode 32B includes a first electrode portion 321B and a plurality of second electrode portions 322B.

The first electrode portion 321B extends parallel with the second source wires 30B and overlaps a second source wire 30B in plan view. The plurality of second electrode portions 322B are each connected to the first electrode portion 321B. The plurality of second electrode portions 322B are arranged side-by-side with a prescribed space therebetween in the direction in which the first electrode portion 321B extends. Each of the plurality of second electrode portions 322B extends parallel with the gate wires 28. The second electrode portions 322B of the drive electrode 32B and the second electrode portions 322A of the drive electrode 32A are arranged side-by-side in an alternating manner in the direction in which the source wires 30 extend.

A connection electrode portion 323B is formed at one end of the second electrode portions 322B. The connection electrode portion 323B has a contact hole 324B. The connection electrode portion 323B is connected to a drain electrode portion 326B by way of a contact electrode portion 325B. The contact electrode portion 325B is formed at a position that superimposes the contact hole 324B. The drain electrode portion 326B is connected to the drain of the thin film transistor 34B.

The opposite substrate 12B is arranged opposing the active matrix substrate 12A. The opposite substrate 12B includes a base substrate 48 and the opposite electrode 38. The opposite electrode 38 is formed on a main surface of the base substrate 48, for example.

The liquid crystal layer 12C is sealed between the active matrix substrate 12A and the opposite substrate 12B. In the liquid crystal layer 12C, liquid crystal molecules have positive dielectric anisotropy and are vertically oriented.

The orientation of liquid crystal molecules 50 in the liquid crystal layer 12C will be described with reference to FIGS. 4A and 4B.

Figure 4A:
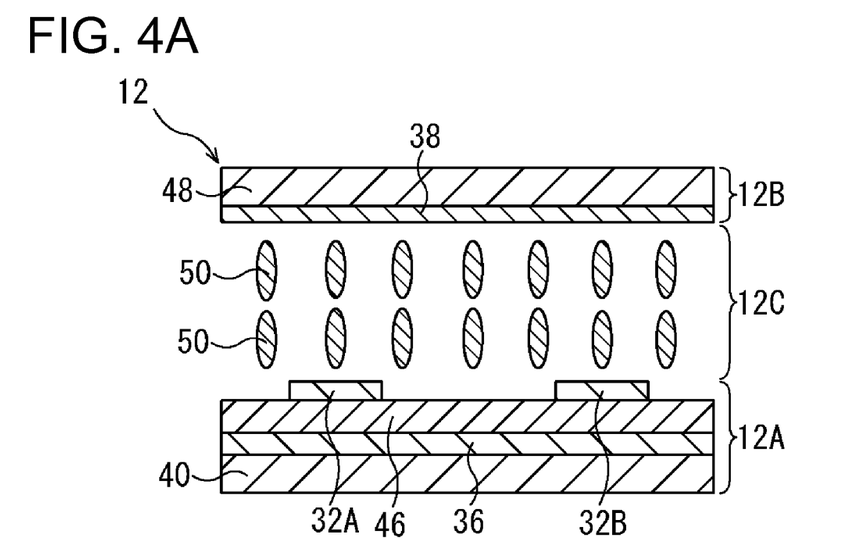
FIG. 4A is a cross-sectional view showing a schematic configuration of a liquid crystal panel, which shows a state where a horizontal electric field is not being generated.

The liquid crystal molecules 50 maintain an initial orientation (vertical orientation) when a horizontal electric field is not being generated (see FIG. 4A). The pixels 16 that have this kind of orientation display black in the liquid crystal panel 12.

The driver 26 causes a vertical electric field to be generated regardless of whether or not there is a horizontal electric field. The vertical electric field acts in the direction in which the liquid crystal molecules 50 are vertically oriented.

Figure 4B:
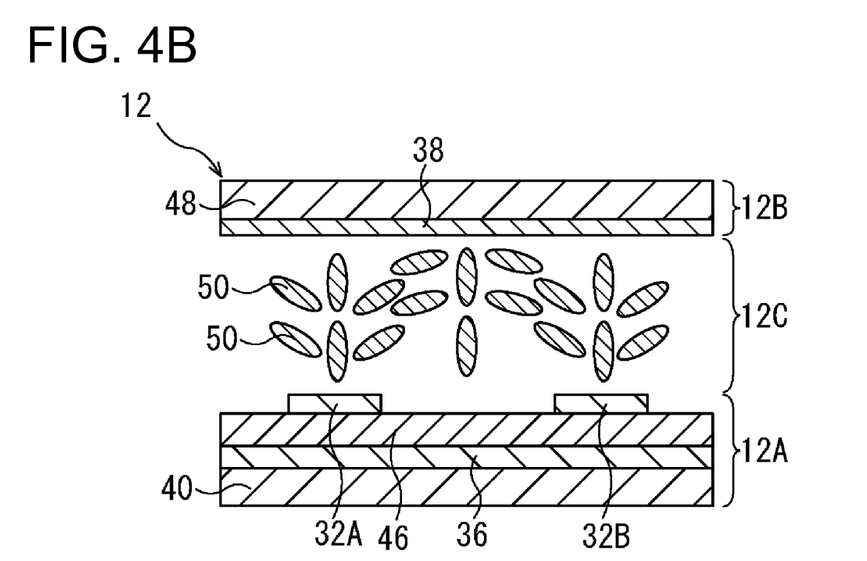
FIG. 4B is a cross-sectional view showing a schematic configuration of the liquid crystal panel, which shows a state where a horizontal electric field is being generated.

The orientation of the liquid crystal molecules 50 changes when the driver 24 causes a horizontal electric field to be generated (see FIG. 4B). The orientation of the liquid crystal molecules 50 changes according to the intensity of the horizontal electric field. The pixels 16 that are oriented as shown in FIG. 4B display white in the liquid crystal panel 12.

The liquid crystal molecules 50 return to the initial orientation (vertical orientation) due to the action of the vertical electric field as the effect of the horizontal electric field becomes weaker. The response speed of the liquid crystal molecules 50 is thereby improved.

Figure 5:
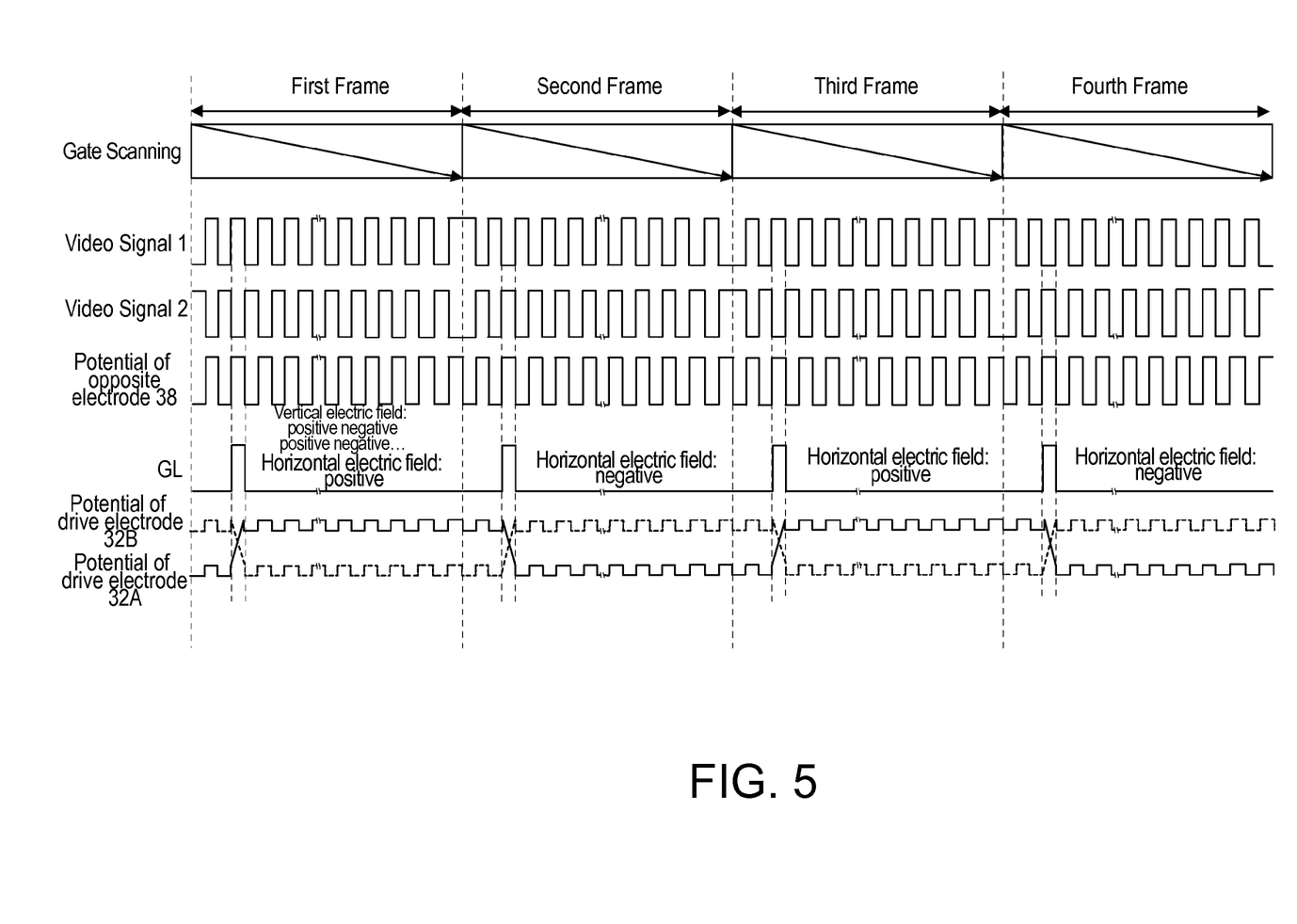
FIG. 5 is a time chart showing the relationship between the polarity of a vertical electric field and the polarity of a horizontal electric field in Embodiment 1.

The relationship between the polarity of a vertical electric field and the polarity of a horizontal electric field will be described with reference to FIG. 5. FIG. 5 shows the relationship between the polarity of a vertical electric field and the polarity of a horizontal electric field for a pixel 16 in which the thin film transistors 34A and 34B are connected to a certain gate wire 28.

The driver 26 causes the relationship between the potentials of the common electrode 36 and the opposite electrode 38 to change for each horizontal period. Specifically, the driver 26 causes the potential of the opposite electrode 38 to change for each horizontal period and keeps the potential of the common electrode 36 constant. At such time, the driver 26 changes the potential of the opposite electrode 38 to be higher and to be lower than the potential of the common electrode 36. In other words, in the example shown in FIG. 5, the driver 26 causes the polarity of the vertical electric field to change for each horizontal period. It should be noted that, in the example shown in FIG. 5, the polarity of the vertical electric field is positive when the potential of the opposite electrode 38 is higher than the potential of the common electrode 36.

The driver 24 causes the relationship between the potentials of the drive electrodes 32A and 32B in each pair thereof to change for each frame. Specifically, the driver 24 changes the potential of the drive electrode 32A to be higher and to be lower than the potential of the drive electrode 32B. In other words, in the example shown in FIG. 5, the driver 24 causes the polarity of the horizontal electric field to change for each frame. It should be noted that, in the example shown in FIG. 5, the polarity of the horizontal electric field is positive when the potential of the drive electrode 32A is higher than the potential of the drive electrode 32B.

The driver 26 controls the polarity of the vertical electric field such that periods in which the polarity of the vertical electric field is positive and periods in which the polarity of the vertical electric field is negative when the driver 24 is maintaining the polarity of the horizontal electric field have the same length.

It should be noted that, in the example shown in FIG. 5, the potential of each drive electrode 32A and 32B fluctuates for each horizontal period due to the driver 26 causing the potential of the opposite electrode 38 to change for each horizontal period.

As shown in FIG. 5, in the liquid crystal display device 10, the vertical electric field has a positive polarity and a negative polarity when the horizontal electric field has a positive polarity, and the vertical electric field has a positive polarity and a negative polarity when the horizontal electric field has a negative polarity. Therefore, the combinations of polarities required when both the vertical electric field and the horizontal electric field are to be used can be realized with two frames. As a result, flickering can be reduced.

Application Example 1 of Embodiment 1

In the example shown in FIG. 5, the driver 26 caused the polarity of the vertical electric field to change for each horizontal period; however, the driver 26 may cause the polarity of the vertical electric field to change for each of a plurality of horizontal periods.

Application Example 2 of Embodiment 1

Figure 6:
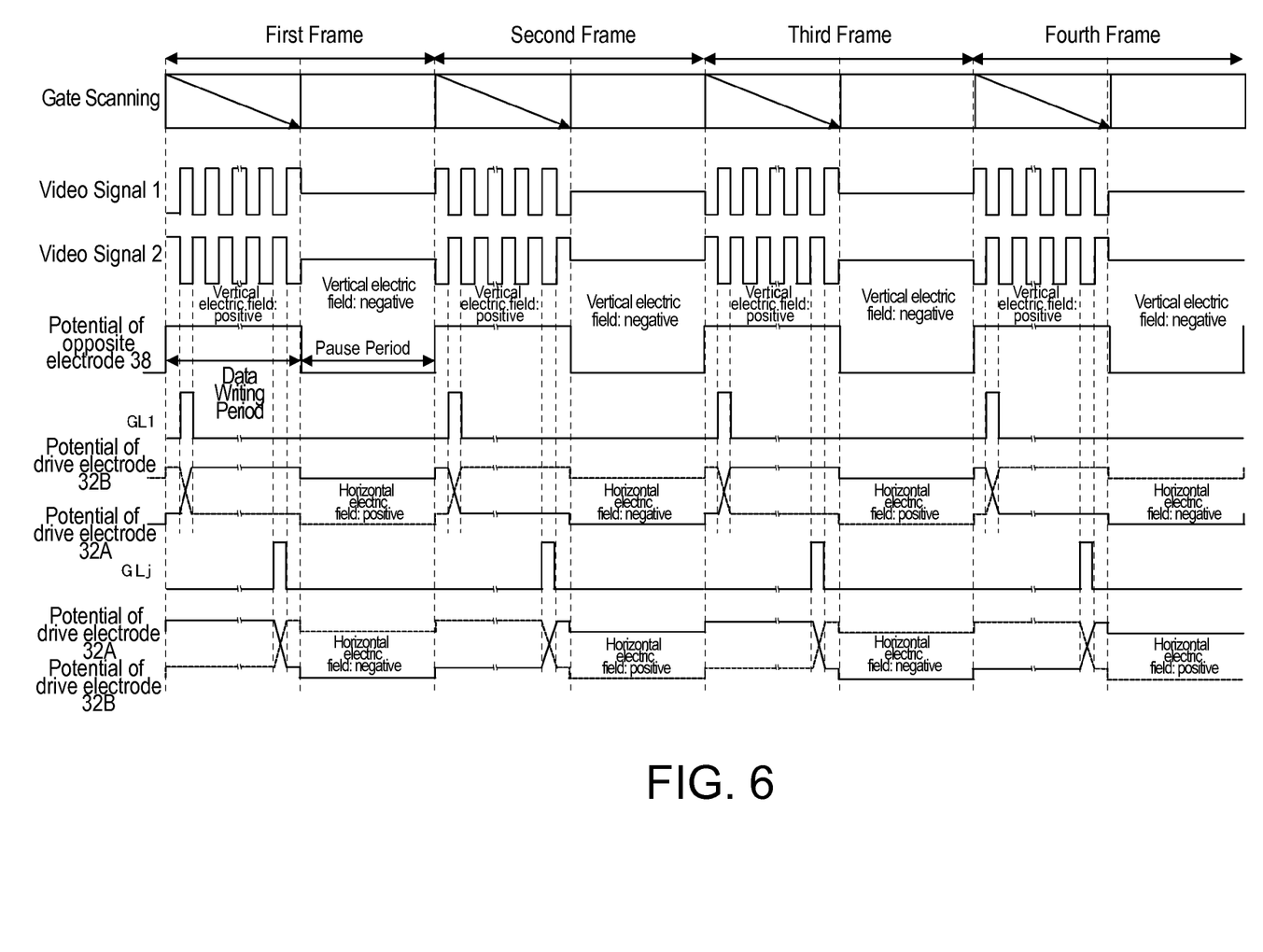
FIG. 6 is a time chart showing the relationship between the polarity of a vertical electric field and the polarity of a horizontal electric field in Application Example 2 of Embodiment 1.

In the example shown in FIG. 5, the period required for the driver 24 to write data in all of the pixels 16 (data writing period) was one frame; however, as shown in FIG. 6, the data writing period may be a period that is shorter than one frame, for example. In this case, there is a period in which data is not written (pause period) for each frame. In the example shown in FIG. 6, the data writing period is a ½ frame. Consequently, the pause period is a ½ frame.

The driver 26 controls the polarity of the vertical electric field such that periods in which the polarity of the vertical electric field is positive and periods in which the polarity of the vertical electric field is negative when the driver 24 is maintaining the polarity of the horizontal electric field have the same length. Specifically, the driver 26 sets the polarity of the vertical electric field during the data writing period to positive, and sets the polarity of the vertical electric field during the pause period to negative.

It should be noted that FIG. 6 shows the relationship between the polarity of a vertical electric field and the polarity of a horizontal electric field for a pixel 16 in which the thin film transistors 34A and 34B are connected to the gate wire 28 of a first row, and also the relationship between the polarity of a vertical electric field and the polarity of a horizontal electric field for a pixel 16 in which the thin film transistors 34A and 34B are connected to the gate wire 28 of a $j^{th}$ row.

In an aspect such as this, since there is a pause period for each frame, the amount of power consumed can be suppressed.

The driver 26 causes the potential of the opposite electrode 38 to change fewer times compared with Embodiment 1. Therefore, the load incurred when the driver 26 causes the potential of the opposite electrode 38 to change decreases compared with Embodiment 1. As a result, the load incurred when the driver 26 causes the potential of the opposite electrode 38 to change decreases even when the liquid crystal panel 12 is large.

In the example shown in FIG. 6, the data writing period and the pause period were both a ½ frame. In other words, the driver 24 wrote data at twice the speed, and the driver 26 caused the polarity of the vertical electric field to be inverted for each ½ frame. However, the data writing period and the period in which the polarity of the vertical electric field is inverted are not limited to the aspect shown in FIG. 6. For example, the driver 24 may write data at a speed of 2 m, and the driver 26 may cause the polarity of the vertical electric field to be inverted for each ½n frame. Here, m is an integer of 1 or more, and n is a positive number of 1 or more and is an integer that is equal to or less than m.

It should be noted that, in the present application example, it is desirable that a semiconductor active layer of the thin film transistors 34A and 34B be an oxide semiconductor in order to shorten the data writing period.

Application Example 3 of Embodiment 1

Figure 7:
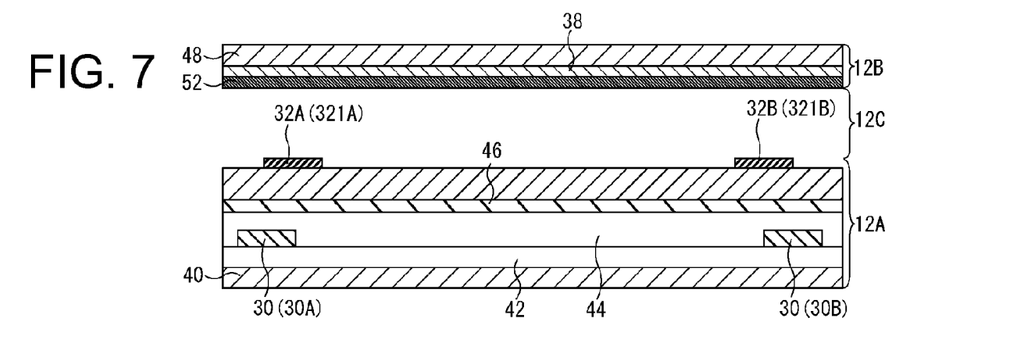
FIG. 7 is a cross-sectional view showing a schematic configuration of a pixel of a liquid crystal panel in Application Example 3 of Embodiment 1.

As shown in FIG. 7, the opposite substrate 12B may include a dielectric layer 52. The dielectric layer 52 is arranged nearer to the liquid crystal layer 12C than the opposite electrode 38. The dielectric layer 52 is made of an organic film, an ultraviolet curing resin, or a thermosetting resin, for example.

In an aspect such as this, it becomes easier for liquid crystal molecules 46 near the opposite electrode 38 to become horizontal when the horizontal electric field is being generated. Therefore, transmittance is improved.

Application Example 4 of Embodiment 1

In the example shown in FIG. 5, the driver 26 caused the potential of the opposite electrode 38 to change; however, the driver 26 may cause the potential of the common electrode 36 to change.

Embodiment 2

Figure 8:
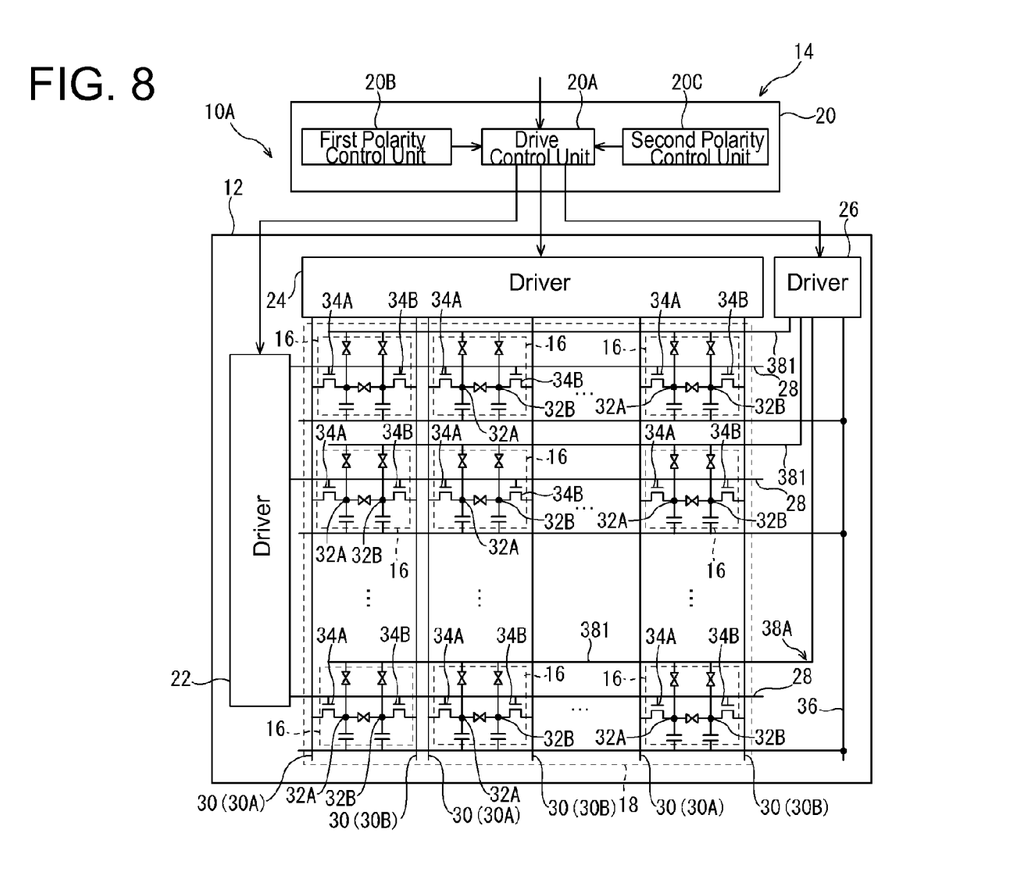
FIG. 8 is a schematic drawing showing an example of a schematic configuration of a liquid display device according to Embodiment 2 of the present invention.

FIG. 8 shows a liquid crystal display device 10A according to Embodiment 2 of the present invention. An opposite electrode in the liquid crystal display device 10A is different compared with the liquid crystal display device 10. An opposite electrode 38A of the present embodiment includes a plurality of segmented electrodes 381. Each segmented electrode 381 extends parallel with gate wires 28. A driver 26 is connected to each segmented electrode 381. The driver 26 causes the potential of each segmented electrode 381 to change sequentially.

Figure 9:
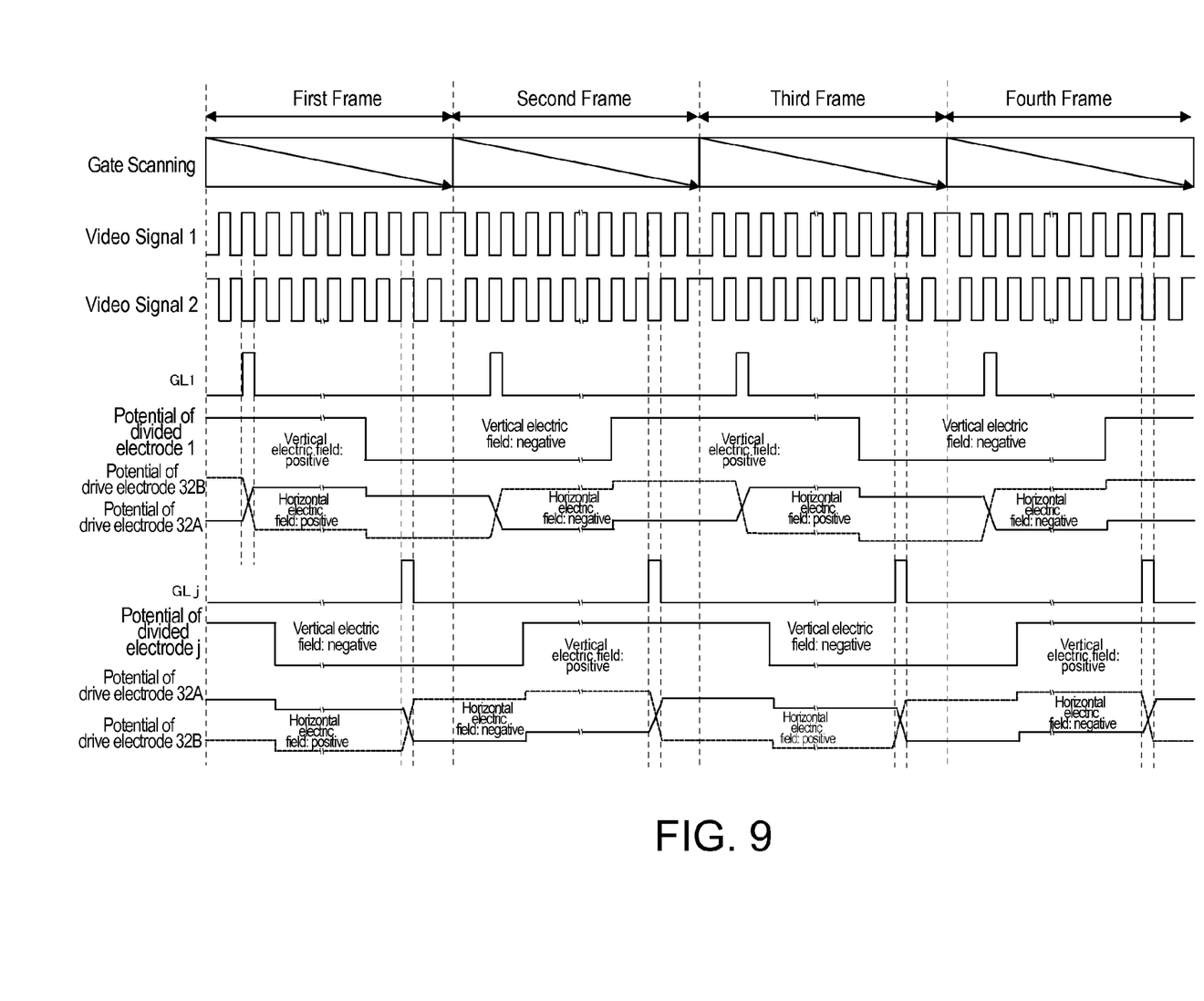
FIG. 9 is a time chart showing the relationship between the polarity of a vertical electric field and the polarity of a horizontal electric field in Embodiment 2.

The relationship between the polarity of a vertical electric field and the polarity of a horizontal electric field will be described with reference to FIG. 9. FIG. 9 shows the relationship between the polarity of a vertical electric field and the polarity of a horizontal electric field for a pixel 16 in which thin film transistors 34A and 34B are connected to the gate wire 28 of a first row, and also the relationship between the polarity of a vertical electric field and the polarity of a horizontal electric field for a pixel 16 in which the thin film transistors 34A and 34B are connected to the gate wire 28 of a $j^{th}$ row.

The driver 26 causes the relationship between the potential of each segmented electrode 381 and the potential of a common electrode 36 to change for each frame. Specifically, the driver 26 causes the potential of each segmented electrode 381 to change for each frame and keeps the potential of the common electrode 36 constant. At such time, the driver 26 changes the potential of each segmented electrode 381 to be higher and to be lower than the potential of the common electrode 36. In other words, in the example shown in FIG. 9, the driver 26 causes the polarity of the vertical electric field to change for each frame. It should be noted that, in the example shown in FIG. 9, the polarity of the vertical electric field is positive when the potential of each segmented electrode 381 is higher than the potential of the common electrode 36.

A driver 24 causes the relationship between the potentials of drive electrodes 32A and 32B in each pair thereof to change for each frame. Specifically, the driver 24 changes the potential of the drive electrode 32A to be higher and to be lower than the potential of the drive electrode 32B. In other words, in the example shown in FIG. 9, the driver 24 causes the polarity of the horizontal electric field to change for each frame. It should be noted that, in the example shown in FIG. 9, the polarity of the horizontal electric field is positive when the potential of the drive electrode 32A is higher than the potential of the drive electrode 32B.

The driver 26 controls the polarity of the vertical electric field such that periods in which the polarity of the vertical electric field is positive and periods in which the polarity of the vertical electric field is negative when the driver 24 is maintaining the polarity of the horizontal electric field have the same length.

It should be noted that, in the example shown in FIG. 9, the potential of each drive electrode 32A and 32B fluctuates for each frame due to the driver 26 causing the potential of each segmented electrode 381 to change for each frame.

As shown in FIG. 9, in the liquid crystal display device 10A, the vertical electric field has a positive polarity and a negative polarity when the horizontal electric field has a positive polarity, and the vertical electric field has a positive polarity and a negative polarity when the horizontal electric field has a negative polarity. Therefore, the combinations of polarities required when both the vertical electric field and the horizontal electric field are to be used can be realized with two frames. As a result, flickering can be reduced.

The potentials of the plurality of segmented electrodes 381 change sequentially. Therefore, the relationship between the potential of the opposite electrode 38 (segmented electrodes 381) and the potential of the common electrode 36 in the period after the driver 24 has written data (holding period) becomes the same in all of the pixels 16.

Application Example of Embodiment 2

The polarity of the vertical electric field when the driver 24 writes data may be uniform in all of the pixels 16.

Embodiment 3

Figure 10:
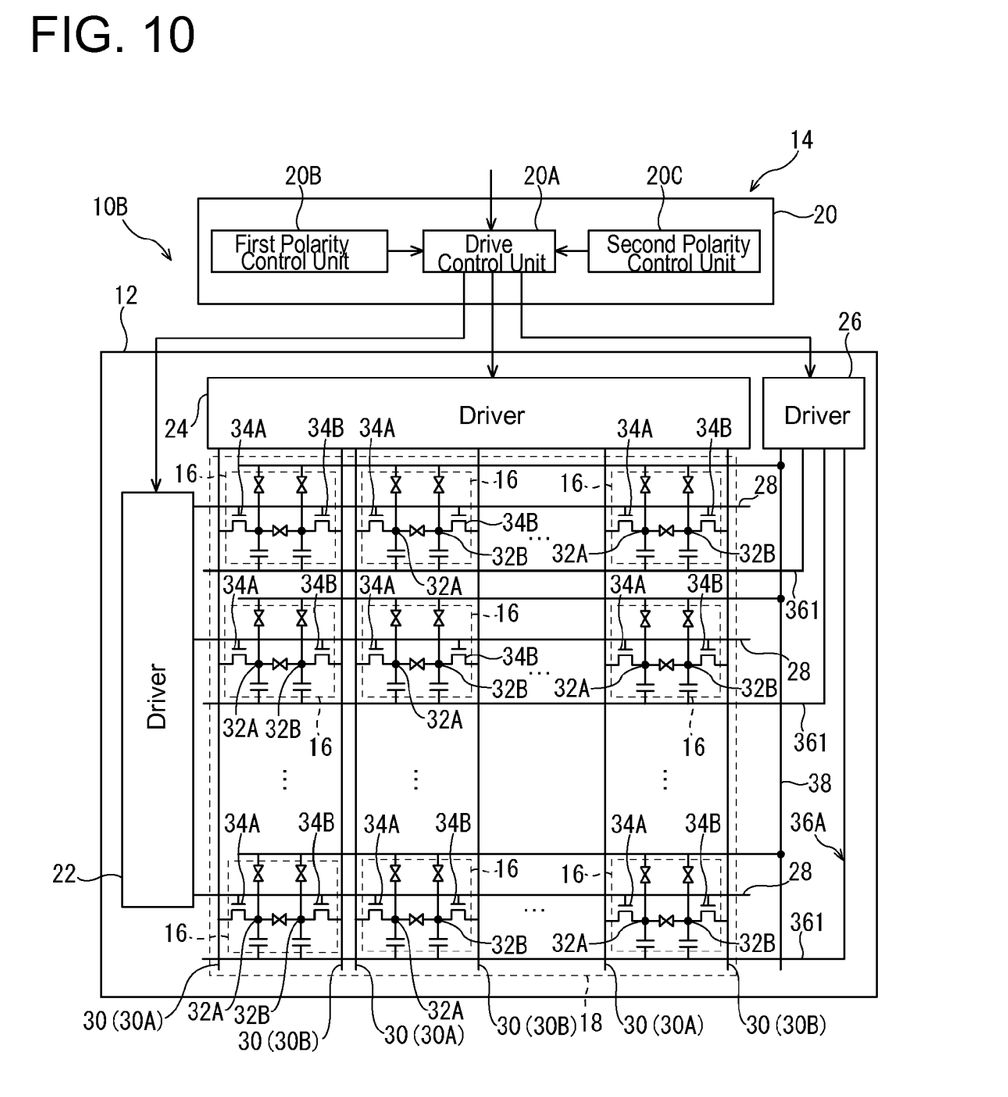
FIG. 10 is a schematic drawing showing an example of a schematic configuration of a liquid display device according to Embodiment 3 of the present invention.

FIG. 10 shows a liquid crystal display device 10B according to Embodiment 3 of the present invention. A common electrode in the liquid crystal display device 10B is different compared with the liquid crystal display device 10. A common electrode 36A of the present embodiment includes a plurality of segmented electrodes 361. Each segmented electrode 361 extends parallel with gate wires 28. A driver 26 is connected to each segmented electrode 361. The driver 26 causes the potential of each segmented electrode 361 to change sequentially.

Figure 11:
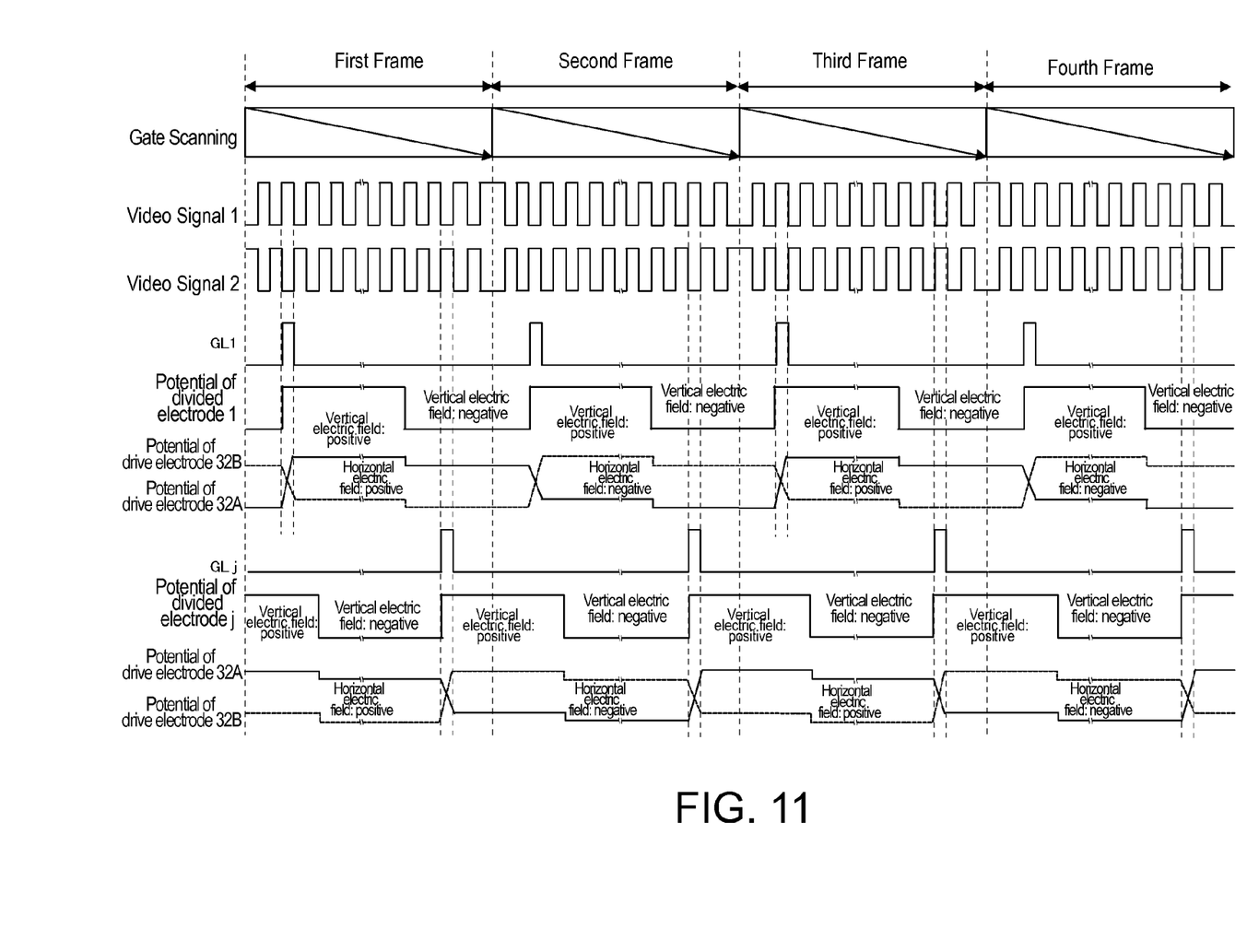
FIG. 11 is a time chart showing the relationship between the polarity of a vertical electric field and the polarity of a horizontal electric field in Embodiment 3.

The relationship between the polarity of a vertical electric field and the polarity of a horizontal electric field will be described with reference to FIG. 11. FIG. 11 shows the relationship between the polarity of a vertical electric field and the polarity of a horizontal electric field for a pixel 16 in which thin film transistors 34A and 34B are connected to the gate wire 28 of a first row, and also the relationship between the polarity of a vertical electric field and the polarity of a horizontal electric field for a pixel 16 in which the thin film transistors 34A and 34B are connected to the gate wire 28 of a $j^{th}$ row.

The driver 26 causes the relationship between the potential of each segmented electrode 361 and the potential of an opposite electrode 38 to change for each frame. Specifically, the driver 26 causes the potential of each segmented electrode 361 to change for each frame and keeps the potential of the opposite electrode 38 constant. At such time, the driver 26 changes the potential of each segmented electrode 361 to be higher and to be lower than the potential of the opposite electrode 38. In other words, in the example shown in FIG. 11, the driver 26 causes the polarity of the vertical electric field to change for each frame. It should be noted that, in the example shown in FIG. 11, the polarity of the vertical electric field is positive when the potential of each segmented electrode 361 is higher than the potential of the opposite electrode 38.

A driver 24 causes the relationship between the potentials of drive electrodes 32A and 32B in each pair thereof to change for each frame. Specifically, the driver 24 changes the potential of the drive electrode 32A to be higher and to be lower than the potential of the drive electrode 32B. In other words, in the example shown in FIG. 11, the driver 24 causes the polarity of the horizontal electric field to change for each frame. It should be noted that, in the example shown in FIG. 11, the polarity of the horizontal electric field is positive when the potential of the drive electrode 32A is higher than the potential of the drive electrode 32B.

The driver 26 controls the polarity of the vertical electric field such that periods in which the polarity of the vertical electric field is positive and periods in which the polarity of the vertical electric field is negative when the driver 24 is maintaining the polarity of the horizontal electric field have the same length.

It should be noted that, in the example shown in FIG. 11, the potential of each drive electrode 32A and 32B fluctuates for each frame due to the driver 26 causing the potential of each segmented electrode 361 to change for each frame.

As shown in FIG. 11, in the liquid crystal display device 10B, the vertical electric field has a positive polarity and a negative polarity when the horizontal electric field has a positive polarity, and the vertical electric field has a positive polarity and a negative polarity when the horizontal electric field has a negative polarity. Therefore, the combinations of polarities required when both the vertical electric field and the horizontal electric field are to be used can be realized with two frames. As a result, flickering can be reduced.

The driver 26 causes the potentials of the plurality of segmented electrodes 361 to change sequentially. Therefore, the relationship between the potential of the opposite electrode 38 and the potential of the common electrode 36 (segmented electrodes 361) in the period after the driver 24 has written data (holding period) becomes the same in all of the pixels 16.

The driver 26 sets the polarity of the vertical electric field to positive in all of the pixels 16 when the driver 24 writes data. Therefore, the potential of each drive electrode 32A and 32B drops in all of the pixels 16 when the driver 26 changes the polarity of the vertical electric field. In other words, the direction in which the polarity of the vertical electric field is inverted when the horizontal electric field is maintained with a positive polarity and the direction in which the polarity of the vertical electric field is inverted when the horizontal electric field is maintained with a negative polarity become the same. Here, if the polarity of a vertical electric field is negative when the driver 24 writes data, the potential of each drive electrode 32A and 32B rises when the driver 26 changes the polarity of the vertical electric field. In other words, if the polarity of the vertical electric field is not uniform when the driver 24 writes data, the range of fluctuation in the potential of each drive electrode 32A and 32B produced when the driver 26 causes the polarity of the vertical electric field to change becomes greater than in the case where the polarity of the vertical electric field is uniform when the driver 24 writes data. Therefore, the reliability of the operations of the thin film transistors 34A and 34B decreases. However, in the present embodiment, the polarity of the vertical electric field is uniform when the driver 24 writes data. Therefore, it is possible to reduce the range of fluctuation in the potential of each drive electrode 32A and 32B produced when the driver 26 causes the polarity of the vertical electric field to change. As a result, the reliability of the operations of the thin film transistors 34A and 34B is improved.

Application Examples of Embodiment 3

The polarity of the vertical electric field when the driver 24 writes data may be negative in all of the pixels 16.

The polarity of the vertical electric field when the driver 24 writes data may not be uniform in all of the pixels 16.

Heretofore, embodiments of the present invention have been described in detail; however, these are merely exemplary and the present invention is not limited in any way by the aforementioned embodiments.

For example, the liquid crystal molecules have positive dielectric anisotropy in Embodiments 1 to 3, but the liquid crystal molecules may have negative dielectric anisotropy.

What is claimed is:

1. A liquid crystal display device, comprising:
a liquid crystal panel that has a display region in which a plurality of pixels are arranged; and
a control unit that causes an image to be displayed in said display region,
wherein said liquid crystal panel includes:
an active matrix substrate;
an opposite substrate facing said active matrix substrate; and
a liquid crystal layer sealed between said active matrix substrate and said opposite substrate,
wherein said active matrix substrate includes:
a pair of drive electrodes in each pixel; and
a common electrode arranged further away from said liquid crystal layer than said pair of drive electrodes in each pixel,
wherein said opposite substrate includes an opposite electrode facing said common electrode and said pair of drive electrodes in each pixel,
wherein said control unit includes:
a horizontal electric field control unit that controls potentials of said pair of drive electrodes in each pixel to control a horizontal electric field that is generated between each of said pair of drive electrodes in each pixel, and
a vertical electric field control unit that controls potentials of said common electrode and said opposite electrode to control a vertical electric field that is generated between said common electrode and said opposite electrode,
wherein, when said vertical electric field control unit is causing said vertical electric field to be generated, said horizontal electric field control unit controls an intensity and a polarity of said horizontal electric field, and
wherein, when said horizontal electric field control unit is maintaining the polarity of said horizontal electric field, said vertical electric field control unit inverts a polarity of said vertical electric field.

2. The liquid crystal display device according to claim 1, wherein, when the polarity of the horizontal electric field is being maintained, the vertical electric field control unit causes a length of a period in which the polarity of the vertical electric field is positive to be the same as a length of a period in which the polarity of said vertical electric field is negative.

3. The liquid crystal display device according to claim 1, wherein said vertical electric field control unit causes a potential of said opposite electrode to change to invert the polarity of said vertical electric field.

4. The liquid crystal display device according to claim 3, wherein said opposite electrode includes a plurality of segmented electrodes, and
wherein said vertical electric field control unit causes a potential of each of the segmented electrodes to change sequentially.

5. The liquid crystal display device according to claim 1, wherein said vertical electric field control unit causes the potential of said common electrode to change to invert the polarity of said vertical electric field.

6. The liquid crystal display device according to claim 5, wherein said common electrode includes a plurality of segmented electrodes, and
wherein said vertical electric field control unit causes a potential of each of the segmented electrodes to change sequentially.

7. The liquid crystal display device according to claim 1, wherein a direction in which the polarity of said vertical electric field is inverted when said horizontal electric field is maintained with a positive polarity is the same as a direction in which the polarity of said vertical electric field is inverted when said horizontal electric field is maintained with a negative polarity.

8. The liquid crystal display device according to claim 1, wherein said opposite substrate further comprises a dielectric layer arranged closer to said liquid crystal layer than said opposite electrode.

9. The liquid crystal display device according to claim 1, wherein said horizontal electric field control unit controls the potentials of said pair of drive electrodes in each pixel with respect to all of said pixels in a period that is shorter than one frame.

10. The liquid crystal display device according to claim 1, wherein, said vertical electric field control unit inverts the polarity of said vertical electric field within each vertical scanning period of the image to be displayed, which constitutes a frame of the image, and said horizontal electric field control unit inverts the polarity of said horizontal electric field for every such vertical scanning period.

* * * * *